Patented Aug. 23, 1927.

1,640,092

UNITED STATES PATENT OFFICE.

JOSEPH F. MURRAY AND JOHN SMITH, OF MAYFIELD, PENNSYLVANIA.

COMPOSITION FOR PREVENTING THE ACCUMULATION OF RAINDROPS ON WINDOWS.

No Drawing. Application filed August 17, 1926. Serial No. 129,864.

This invention relates to a composition for application to windows and particularly the windshields of automobiles, street cars, and the like so as to prevent the accumulation of rain drops thereon resulting in the impairing of the vision of the operators of the machines, which is a decided disadvantage in the operation of automobiles and street cars during rainy weather.

One of the primary objects of the invention is to provide a composition to be applied to windows for receiving the above mentioned result that may be easily and inexpensively compounded and that may be applied to windows by wiping the material over the outer surface thereof.

A further object of the invention is to provide a composition of this character that may be effectively used in the cleaning of windshields or other glass surfaces.

The ingredients of the composition together with their general proportions in the compounding of one gallon of the liquid are as follows: three quarts of pure water, one-half pint of nicotine, four ounces pure alcohol, four ounces bluing, one teaspoonful liquid soap, eight ounces onion juice, eight ounces of a suitable color.

The above ingredients may be compounded in any manner desirable, and after the same have been thoroughly mixed, the preparation is allowed to stand for at least thirty days to procure strength after which the same is disposed within suitable containers.

We have found that by applying a thin coat of this substance to vehicle windshields, as well as the glass panes of building windows, water will run freely thereacross and not collect in drops so as to mar the vision.

The preparation is of extremely great advantage in preventing the accumulation of rain drops upon vehicle windshields. We have also ascertained that glass surfaces may be thoroughly cleaned by use of such a preparation.

Having thus described the invention, what we claim as new and desire to secure by Letters Patents is:—

In a composition of the class described comprising substantially three quarts of pure water, one-half pint of nicotine, four ounces of alcohol, four ounces of bluing, one teaspoonful of liquid soap, and eight ounces of onion juice.

In testimony whereof we affix our signatures.

JOSEPH F. MURRAY.
JOHN SMITH.